United States Patent
He et al.

(10) Patent No.: US 11,200,638 B2
(45) Date of Patent: Dec. 14, 2021

(54) IMAGE STYLE TRANSFORM METHODS AND APPARATUSES, DEVICES AND STORAGE MEDIA

(71) Applicant: SHENZHEN SENSETIME TECHNOLOGY CO., LTD., Shenzhen (CN)

(72) Inventors: Gaoyuan He, Shenzhen (CN); Yicun Liu, Shenzhen (CN); Xiaohao Chen, Shenzhen (CN); Sijie Ren, Shenzhen (CN)

(73) Assignee: SHENZHEN SENSETIME TECHNOLOGY CO., LTD., Shenzhen (CN)

( * ) Notice: Subject to any disclaimer, the term of this patent is extended or adjusted under 35 U.S.C. 154(b) by 35 days.

(21) Appl. No.: 16/726,885

(22) Filed: Dec. 25, 2019

(65) Prior Publication Data

US 2020/0134778 A1 Apr. 30, 2020

Related U.S. Application Data

(63) Continuation of application No. PCT/CN2018/117293, filed on Nov. 23, 2018.

(30) Foreign Application Priority Data

Aug. 13, 2018 (CN) .......................... 201810917979.7

(51) Int. Cl.
*G06K 9/00* (2006.01)
*G06T 3/00* (2006.01)
(Continued)

(52) U.S. Cl.
CPC .......... *G06T 3/0012* (2013.01); *G06K 9/4652* (2013.01); *G06T 11/001* (2013.01)

(58) Field of Classification Search
CPC .............. G06K 9/4652; G06K 9/00228; G06T 3/0012; G06T 3/60; G06T 3/00;
(Continued)

(56) References Cited

U.S. PATENT DOCUMENTS 6,064,768 A * 5/2000 Hajj .................... G06K 9/4609
382/190
6,862,024 B2 * 3/2005 Perry ...................... G06T 19/00
345/420

(Continued)

FOREIGN PATENT DOCUMENTS

CN 102360490 B 11/2012
CN 105719327 A 6/2016
(Continued)

OTHER PUBLICATIONS

Hidemoto Nakada and Hideki Asoh; "A Style Transfer Method using Variational Autoencoder", National Institute of Advanced Industrial Science and Technology Umezono 1-1-1, Tsukuba, Ibaraki, 305-8560 Japan, Mar. 11, 2018, vol. 117 No. 513, pp. 121-126.

(Continued)

*Primary Examiner* — Amir Alavi
(74) *Attorney, Agent, or Firm* — Syncoda LLC; Feng Ma

(57) ABSTRACT

An image style transform method includes: acquiring an initial image to be subjected to style transform; inputting a gradient of the initial image to an image style transform model, and obtaining a feature map of the initial image in a gradient domain from the image style transform model, where the image style transform model is obtained by being trained in the gradient domain based on a pixel-wise loss and a perceptual loss; and performing image reconstruction according to the feature map of the initial image in the gradient domain to obtain a style image.

20 Claims, 11 Drawing Sheets

(51) Int. Cl.
*G06K 9/46* (2006.01)
*G06T 11/00* (2006.01)

(58) Field of Classification Search
CPC ......... G06T 3/40; G06T 11/001; G06T 11/60; G06T 1/60; G06T 5/006; G06T 5/20; G06F 17/148
See application file for complete search history.

(56) References Cited

U.S. PATENT DOCUMENTS

| | | | |
|---|---|---|---|
| 7,146,028 B2* | 12/2006 | Lestideau | G06K 9/00228 382/118 |
| 8,009,921 B2* | 8/2011 | Csurka | G06T 11/60 382/228 |
| 8,306,366 B2* | 11/2012 | Kwon | G06K 9/00973 382/304 |
| 8,705,847 B2* | 4/2014 | Kuo | G06K 9/00369 382/154 |
| 10,477,200 B2* | 11/2019 | Toksvig | G06K 9/00201 |
| 10,783,622 B2* | 9/2020 | Wang | G06T 5/002 |
| 2015/0371360 A1* | 12/2015 | Mohamed | G06K 9/6212 382/282 |
| 2018/0197317 A1 | 7/2018 | Cheng et al. | |
| 2018/0225828 A1 | 8/2018 | Guo et al. | |
| 2018/0357800 A1* | 12/2018 | Oxholm | G06N 3/084 |
| 2020/0134778 A1* | 4/2020 | He | G06T 11/001 |
| 2021/0044791 A1* | 2/2021 | Zhang | G06T 7/97 |
| 2021/0104087 A1* | 4/2021 | Smith | G06N 3/08 |

FOREIGN PATENT DOCUMENTS

| | | |
|---|---|---|
| CN | 107171932 A | 9/2017 |
| CN | 107277615 A | 10/2017 |
| CN | 107481185 A | 12/2017 |
| CN | 107578367 A | 1/2018 |
| TW | I620441 B | 4/2018 |
| TW | M558943 U | 4/2018 |
| WO | 2015079712 A1 | 6/2015 |
| WO | 2015192263 A1 | 12/2015 |

OTHER PUBLICATIONS

English Translation of the Written Opinion of the International Search Authority in the international application No. PCT/CN2018/117293, dated May 8, 2019.
First Office Action of the Japanese application No. 2019-569805, dated Dec. 8, 2020.
International Search Report in the international application No. PCT/CN2018/117293, dated May 8, 2019.
Zoom and Learn: Generalizing Deep Stereo Matching to Novel Domains; Pang, Jiahao et al., published on Mar. 18, 2018.

* cited by examiner

IMAGE STYLE TRANSFORM METHODS AND APPARATUSES, DEVICES AND STORAGE MEDIA

CROSS-REFERENCE TO RELATED APPLICATIONS

The present application is a continuation of International Application No. PCT/CN2018/117293 filed on Nov. 23, 2018, which claims priority to Chinese Patent Application No. 201810917979.7 filed on Aug. 13, 2018. The disclosures of these applications are hereby incorporated by reference in their entirety.

BACKGROUND

Deep learning-based image style transform is a new research problem in recent years. Although the image style transform problem has always existed, German researcher Gatys uses a neural network method for the first time in 2015, which opens the door to creating image art style with deep learning. The current technology does not optimize the style transform of face photos. For example, when the existing method is applied to a self-portrait image, the common shortcomings are: the deformation of the face edge caused by the image style transform and the inconsistency of the face color.

SUMMARY

The present disclosure relates to image technologies, and in particular, to image style transform methods and apparatuses, devices and storage media.

In view of the above, embodiments of the present disclosure provide image style transform methods and apparatuses, devices and storage media for solving at least one problem existing in the prior art.

The technical solutions of the embodiments of the present disclosure are implemented as follows.

The embodiments of the present disclosure provide an image style transform method, including: acquiring an initial image to be subjected to style transform; inputting a gradient of the initial image to an image style transform model, and obtaining a feature map of the initial image in a gradient domain from the image style transform model, where the image style transform model is obtained by being trained in the gradient domain based on a pixel-wise loss and a perceptual loss; and performing image reconstruction according to the feature map of the initial image in the gradient domain to obtain a style image.

The embodiments of the present disclosure provide an image style transform apparatus, including: a memory storing processor-executable instructions; and a processor arranged to execute the stored processor-executable instructions to perform operations of: acquiring an initial image to be subjected to style transform; inputting a gradient of the initial image to an image style transform model, and obtaining a feature map of the initial image in a gradient domain from the image style transform model, where the image style transform model is obtained by being trained in the gradient domain based on a pixel-wise loss and a perceptual loss; and performing image reconstruction according to the feature map of the initial image in the gradient domain to obtain a style image.

The embodiments of the present disclosure provide an image style transform apparatus, including: an acquisition unit, configured to acquire an initial image to be subjected to style transform; an obtaining unit, configured to input a gradient of the initial image to an image style transform model, and obtain a feature map of the initial image in a gradient domain from the image style transform model, where the image style transform model is obtained by being trained in the gradient domain based on a pixel-wise loss and a perceptual loss; and a reconstruction unit, configured to perform image reconstruction according to the feature map of the initial image in the gradient domain to obtain the style image.

The embodiments of the present disclosure provide a computer device, including a memory and a processor, where the memory stores a computer program that can be run in the processor, and the processor executes the program to realize operations of the image style transform method.

The embodiments of the present disclosure provide a computer-readable storage medium, having a computer program stored thereon, where when the computer program is executed by a processor, operations of the image style transform method are implemented.

The embodiments of the present disclosure provide a computer program product, including a computer executable instruction, where the computer executable instruction is executed to implement operations of the image style transform method.

DETAILED DESCRIPTION

Figure 1:
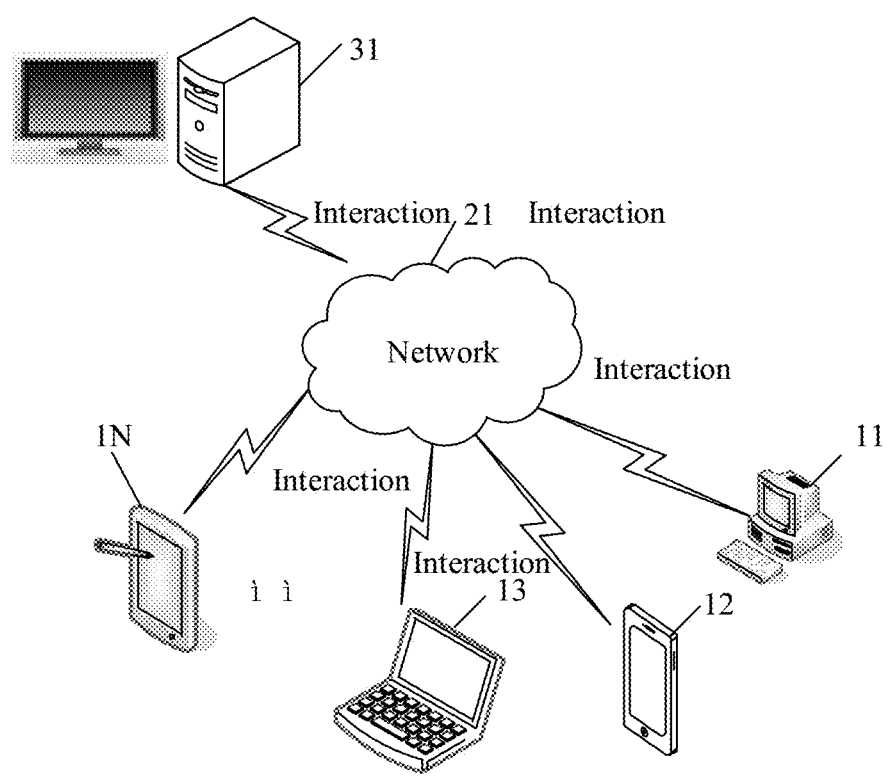
FIG. 1 is a schematic structural diagram of a network architecture according to embodiments of the present disclosure.

The process of generating a style image using a neural network method is generally as follows: using a neural network model such as model VGG16 or VGG19 to separately perform image feature extraction on a content image and a style image, i.e., extracting a content feature from the content image and extracting a style feature from the style image. By constructing loss functions for the content feature and the style feature, a loss value is calculated for a random initialization image and a redraw image is fed back to obtain a generated image. The generated image is similar to the content image in content, and similar to the style image in style. However, this algorithm requires training each time an image is generated, which takes a long time.

A network is trained based on a fast style transfer algorithm, any image may be transformed to a style corresponding to the network, and therefore, the network is forward-propagated each time an image is generated, and the speed will be fast.

The fast transfer algorithm generally contains two networks: an image transform network and a loss network. The image transform network is used to transform the image. The parameters of the image transform network are variable. However, the parameters of the loss network are kept unchanged. A VGG-16 network trained in an ImageNet image library can be used as the loss network, and the content image is converted by image. A result image of the content image through the image transform network, a style image, and the content image pass through the loss network to extract a perceptual loss, and the image transform network is trained by using the perceptual loss. In the training phase, a large number of images are used to train the image transform network to obtain a model. In the output phase, a model is used to output and generate a generated image. The resulting network is three orders of magnitude faster than the Gatys model for generating the generated image.

However, the current technology does not optimize the style transform of face photos. For example, when the existing method is applied to a self-portrait image, there are two obvious shortcomings: 1) the edge of the face may deviate from the original image, that is, the structural information of an output image changes; 2) the skin color of the face may be inconsistent with the original skin color, that is, the color information of the output image changes. The consequence is: after stylization, the user will feel that it is not like himself For example, the portrait of user A in the initial image is a round face, and after stylization, the portrait of user A in the output style image is an awl face. For another example, the skin of user B is fair, and after stylization, the skin of user B in the output style image is dark. That is, how to better maintain the structural information and color information of the original initial image becomes a problem to be solved.

In order to solve the problems in the current technology, the embodiments of the present disclosure provide a Convolutional Neural Network (CNN) structure of image style transform based on an image gradient domain. Due to the edge protection of gradient domain learning, the image style transform network provided by the embodiments of the present disclosure can overcome the disadvantages of the edge deformation of the previous method. In the embodiments of the present disclosure, in the image reconstruction phase of image style transform, a term called color confidence is introduced to maintain the fidelity of the skin color of the resulting image. The image reconstruction phase utilizes both the structural information of the content image and the color information of the content image, which makes the result more natural.

In the embodiments of the present disclosure, the perceptual loss is directly used in the gradient domain for the first time, so that the learned style information is focused on the stroke rather than the color, making it more suitable for the style transform tasks of the face.

In order to better understand the various embodiments of the present disclosure, the relevant nouns are now explained:

Sampling operation: the sampling operation generally refers to a subsampled operation or down-sampled operation. If the sampling object is a continuous signal, the continuous signal is subjected to the subsampled operation to obtain a discrete signal. For an image, the purpose of the subsampled operation may be to reduce the image for ease of calculation. The principle of the subsampled operation is: an image I having a size of M*N is subsampled s times to obtain a resolution image having a size of (M/s)*(N/s), and certainly, s should be a common divisor of M and N. If an image in a matrix form is considered, an image in the s*s window of the original image is turned into a pixel, the value of this pixel point is an average value of all pixels in the window.

Up-sampling operation: the inverse process of the sub-sampled operation, also called up-sampling or interpolating. For an image, a high-resolution image can be obtained by the up-sampling operation. The principle of the up-sampling operation is: image magnification almost uses the interpolating method, that is, new pixels are interposed between pixel points by using a suitable interpolation algorithm based on the original image pixels.

Channel: this word has two different meanings. The first meaning is for a sample image (an image is used as a training sample), the channel refers to a color channel (the number of color channels in the example images), and the color channel will be used below to represent a channel of the sample image. The second meaning is the dimension of the output space, such as the number of output channels in a convolution operation, or the number of convolution kernels in each convolutional layer.

Color channel: an image is de-composited into one or more color components. In a single-color channel, one pixel point is only represented by one numerical value and can only represent gray scale, and 0 is black. In a three-color channel, if a Red Green Blue (RGB) color mode is used, the image is divided into three color channels of red, green and blue, which can represent colors, and all 0s represent black. In a four-color channel, an alpha channel is added to the RGB color mode to represent transparency, and alpha=0 represents full transparent.

A CNN is a multi-layer supervised learning neural network. A convolutional layer and a pool sampling layer of a hidden layer are core modules for implementing a feature extraction function of the CNN. A lower hidden layer of the CNN consists of a convolutional layer and a max-pooling sampling layer, alternately. An upper layer is a hidden layer and logistic regression classifier of a full-connected layer corresponding to the conventional multi-layer perceptron. An input of a first full-connected layer is a feature image obtained by performing feature extraction on the convolutional layer and a sub-sampling layer. The last output layer is a classifier that classifies the image by using logistic regression, Softmax regression or even a support vector machine. Each layer in the CNN consists of multiple maps. Each map consists of multiple neural units. All neural units of the same map share a convolution kernel (i.e., weight). The convolution kernel often represents a feature, for example, a certain convolution kernel represents an arc, then the convolution kernel is convolved over the entire image, and the region with a larger convolution value is most likely an arc. The CNN generally uses a convolutional layer and a sampling layer alternately, that is, one convolutional layer is connected to one sampling layer, and the sampling layer is followed by a convolutional layer. Certainly, multiple convolutional layers may be connected to one sampling layer, so that the convolutional layer extracts features, and then the features are combined to form more abstract features, and finally descriptive features of the image objects are formed. The CNN can also be followed by a full-connected layer.

The CNN structure includes a convolutional layer, a down-sampled layer, and a full-connected layer. Each layer has multiple feature maps, each of which extracts one input feature by means of a convolution filter. Each feature map has multiple neurons. The convolutional layer is used because an important feature of convolution operation, that is, the convolution operation can enhance the original signal features and reduce noise. The down-sampled layer is used because the sub-sampling of the image according to the principle of image local correlation reduces the amount of computation while maintaining the image rotation invariance. The full-connected layer adopts softmax full connection, and the obtained activation value is the image feature extracted by the CNN.

Activation function: a neuron is the basic unit of a multi-layer perceptron, and its function becomes the active transmission. That is, for a neuron, the input is the input of some or all CNNs or the output of some or all previous layers. After the calculation of the activation function, the result is obtained as an output result of the neuron. The commonly used activation functions are a sigmoid function, a tan h function, and a Rectified Linear Unit (ReLu).

ReLu function, the formula is $ReLu(x)=max(0, x)$. It can be seen from the graph of the ReLu function that ReLu has three main changes compared with other activation functions such as the sigmoid function: (1) unilateral suppression; (2) relatively broad excitement boundary; and (3) sparse activation.

Pixel-wise Loss: assuming that Test is an output result of the CNN, and IHR is the original high-resolution image, then the pixel-wise loss emphasizes the matching of each corresponding pixel between two images Test and IHR, which is different from the perceptual result of the human eye. In general, images trained by the pixel-wise loss are generally smoother and lack high-frequency information.

Perceptual Loss: assuming that Test represents an output result of the CNN, and IHR represents the original high-resolution image, the Test and IHR are respectively input into a differentiable function $\Phi$, which avoids the requirement that the network output image is consistent with the original high-resolution image on a pixel-wise basis.

VGG model: the VGG model structure is simple and effective, the first few layers only use 3×3 convolution kernel to increase the network depth, the number of neurons in each layer is reduced by means of max pooling, and the last three layers are two full-connected layers of 4096 neurons and a softmax layer, respectively. "16" and "19" represent the number of network layers in the network that need to update a weight (i.e., a weight, a parameter to be learned). The weights of the VGG16 model and the VGG19 model are trained by means of ImageNet.

Model parameters may generally be understood as configuration variables inside the model. Values of the model parameters may be estimated using historical data or training samples, or, the model parameters are variables that can be automatically learned by means of historical data or training samples. To some extent, the model parameters have the following features: model parameters are required for model prediction; model parameter values can define model functions; model parameters are obtained by data estimation or data learning; model parameters are generally not manually set by practitioners; model parameters are generally stored as a part of the learning model; and model parameters are generally estimated using an optimization algorithm. The optimization algorithm is an efficient search for possible values of the parameters. In artificial neural networks, the weight and deviation of a network model are generally referred to as model parameters.

Model hyper-parameters may generally be understood as configurations outside the model, and the values thereof cannot be estimated from the data. To some extent, the model hyper-parameter features are: model hyper-parameters are generally used in the process of estimating model parameters; model hyper-parameters are generally specified directly by the practitioner; model hyper-parameters may generally be set using a heuristic method; and model hyper-parameters are generally adjusted according to a given predictive modeling problem. In other words, the model hyper-parameters are used to determine some parameters of the model. The hyper-parameters are different, and the models are different. The meaning of model difference is that there is a minor difference. For example, assuming that the models are all CNN models, if the number of layers is different, the models are different, although the models are all CNN models. In deep learning, the hyper-parameters are: learning rate, the number of iterations, the number of layers, the number of neurons per layer, and so on.

The technical solutions of the present disclosure are further described below in detail with reference to the accompanying drawings and embodiments.

The embodiments of the present disclosure first provide a network architecture. FIG. 1 is a schematic structural diagram of a network architecture according to embodiments of the present disclosure. As shown in FIG. 1, the network architecture includes two or more electronic devices 11 to 1N and a server 31, where the electronic devices 11 to 1N are interacted with the server 31 by means of a network 21. The electronic device may be implemented in various types of computer devices having information processing capabilities, for example, the electronic device may include a mobile phone, a tablet computer, a desktop computer, a personal digital assistant, a navigator, a digital telephone, a television, and the like.

The embodiments of the present disclosure provide an image style transform method, which can effectively solve the problem that the structural information of the output image changes compared with the initial image. The method is applied to an electronic device, and the function implemented by the method can be implemented by a processor in the electronic device by invoking a program code. Certainly, the program code may be saved in a computer storage medium. Hence, the electronic device includes at least a processor and a storage medium.

Figure 2A:
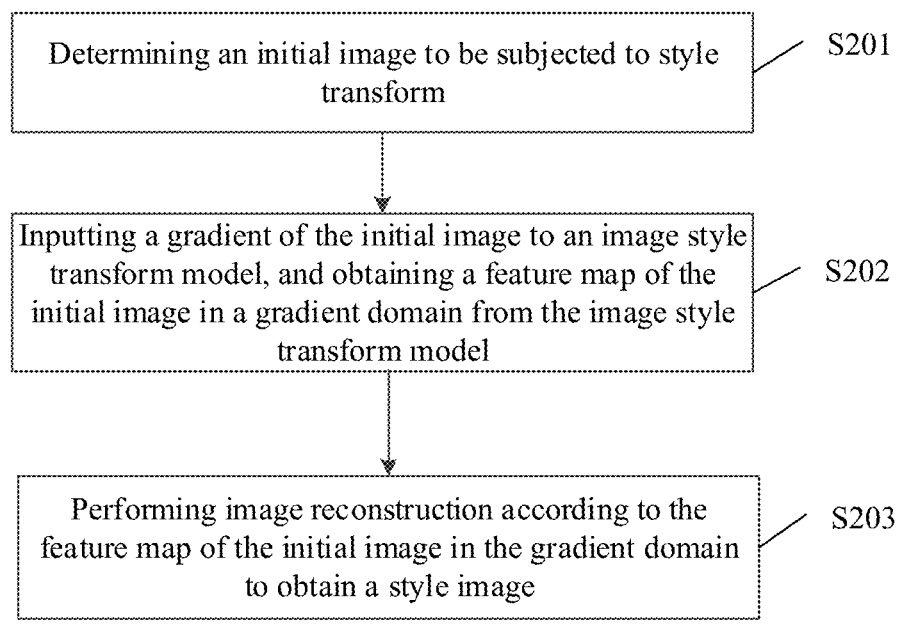
FIG. 2A is a schematic flowchart for implementing an image style transform method according to embodiments of the present disclosure.

FIG. 2A is a schematic flowchart for implementing an image style transform method according to embodiments of the present disclosure. As shown in FIG. 2A, the method includes operations S201 to S203.

In operation S201, an initial image to be subjected to style transform is obtained.

Figure 2B:
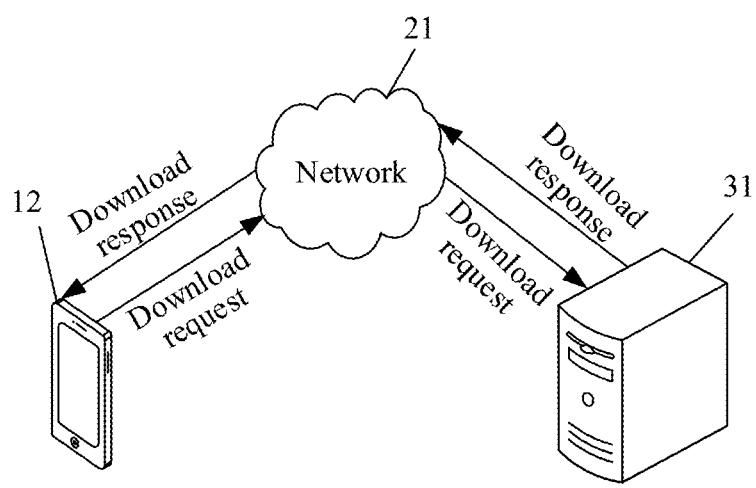
FIG. 2B is a schematic diagram of a download scenario according to embodiments of the present disclosure.

The image style transform method provided by the embodiments of the present disclosure may be embodied by means of a client (application) in the process of implementation. Referring to FIG. 2B, a user downloads the client from a server 31 on an electronic device 12 thereof. For example, the electronic device 12 sends a download request to the server 31 for downloading the client, the server 31 responds to the download request, the server 31 sends a download response to the electronic device 12, where the download response carries the client, such as an Android Package (APK) in the Android system, and then the user installs the downloaded client on the electronic device thereof, and then the electronic device runs the client, so that the image style transform method provided by the embodiments of the present disclosure may be implemented by the electronic device.

If operation S201 is implemented on the electronic device, then the implementation process may be such that when the user selects a picture from an album, the client receives the user's operation of selecting a picture, that is, the client determines the selected picture as an initial image to be subjected to style transform; or, the user takes a photo with a camera of the electronic device or an external camera, and the client receives the user's operation of taking a photo, that is, the client determines the captured photo as an initial image to be subjected to style transform. Those skilled in the art will appreciate that other embodiments of this operation are possible.

In operation S202, a gradient of the initial image is input to an image style transform model, and a feature map of the initial image in a gradient domain is obtained from the image style transform model.

Here, the image style transform model is trained, and is obtained by being trained in the gradient domain based on a pixel-wise loss and a perceptual loss. In some embodiments, the image style transform model is obtained by using the pixel-wise loss and the perceptual loss as training targets in the gradient domain.

In operation S203, image reconstruction is performed according to a feature map of the initial image in the gradient domain to obtain a style image.

Figure 3A:
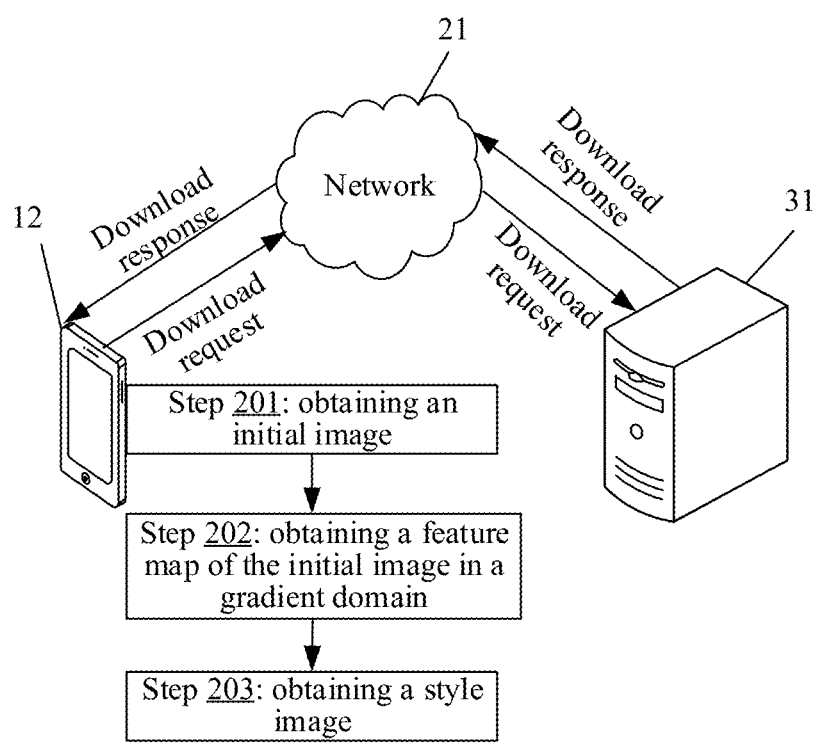
FIG. 3A is a schematic diagram I of an implementation scenario according to embodiments of the present disclosure.

The style image is a reconstructed stylized image. In the process of implementation, the trained image style transform model may be local to the electronic device or at the server. When the trained image style transform model is local to the electronic device, the electronic device may be installed with the client, that is, the trained image style transform model is installed, so that, as shown in FIG. 3A, the electronic device obtains the initial image through operation S201, then the feature map (i.e., an output result) of the initial image in the gradient domain is obtained through operation S202, and finally the output style image is obtained through operation S203. It can be seen from the above process that after the electronic device is installed with the client, operations S201 to S203 are all executed locally in the electronic device. Finally, the electronic device outputs the obtained style image to the user.

Figure 3B:
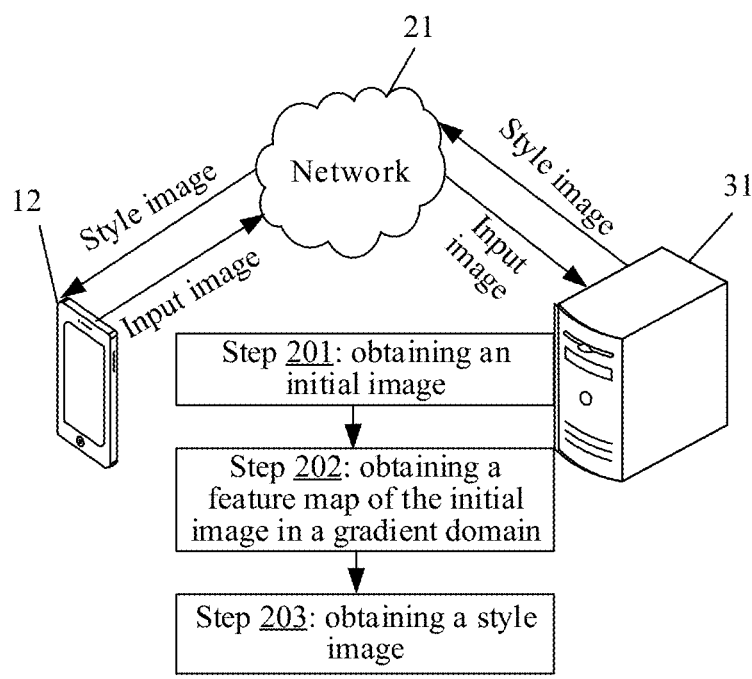
FIG. 3B is a schematic diagram II of an implementation scenario according to embodiments of the present disclosure.

In some embodiments, the trained image style transform model may also be located on the server. As shown in FIG. 3B, the electronic device transmits the initial image to the server, and the server receives the initial image sent by the electronic device, so that the server implements operations S201. In other words, if the foregoing method is implemented on the server, then operation S201 includes: the server receives an initial image sent by the electronic device, that is, the server acquires an initial image subjected to style transform, and then the server obtains the feature map of the initial image in the gradient domain through operation S202, and finally the output style image is obtained through operation S203. It can be seen from the above process that operations S201 to S203 are performed on the server, and finally the server may also send the style image to the electronic device, such that the electronic device outputs the style image to the user after receiving the style image. In the embodiments of the present disclosure, after the electronic device is installed with the client, the user uploads the initial image of the user, and receives the style image sent by the server, and outputs the style image to the user.

Figure 4A:
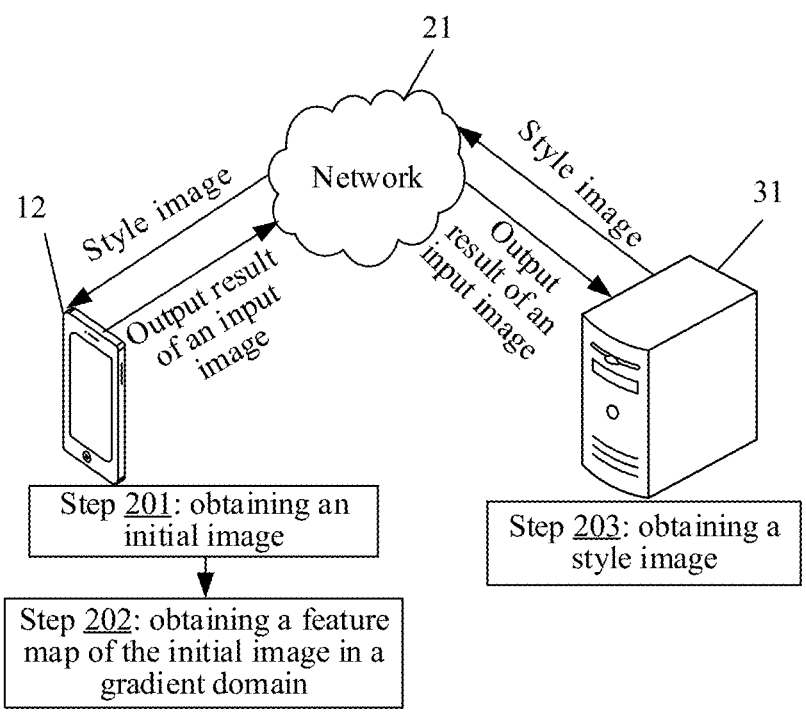
FIG. 4A is a schematic diagram III of an implementation scenario according to embodiments of the present disclosure.
Figure 4B:
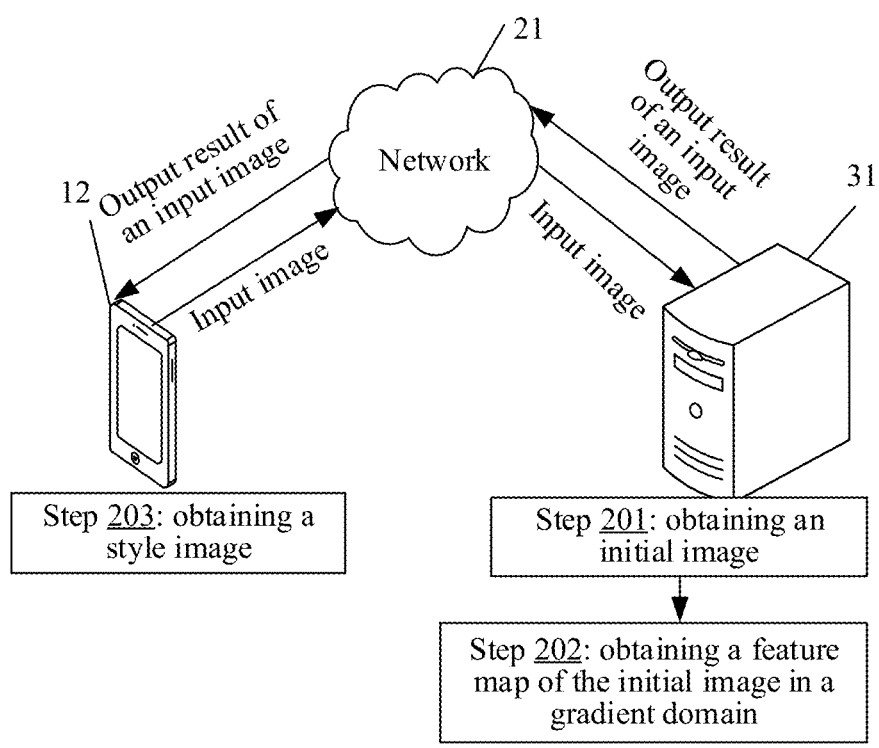
FIG. 4B is a schematic diagram IV of an implementation scenario according to embodiments of the present disclosure.

In some embodiments, operations S201 to S203 may also be partially completed by the electronic device, or partially by the server. For example, referring to FIG. 4A, operations S201 and S202 may be performed locally by the electronic device, and then the electronic device transmits the feature map of the initial image in the gradient domain to the server, a style image is obtained after the server performs operation S203, and then the style image is sent to the electronic device for output. In another example, referring to FIG. 4B, operations S201 and S202 may be performed by the server, the server sends the feature map of the initial image in the gradient domain to the electronic device, a style image is obtained after the electronic device performs operation S203, and then the style image is output to the user.

In some embodiments, the method further includes: training the image style transform model, where a training target of the image style transform model is that a total loss $L_{total}$ is minimum, where $L_{total}$ is represented by the following equation:

$$L_{total} = \alpha L_{feat} + \beta L_{pixel},$$

where $L_{feat}$ represents the perceptual loss, $L_{pixel}$ represents the pixel-wise loss, and values of $\alpha$ and $\beta$ are real numbers. The ratio of the $\alpha$ to the $\beta$ is greater than 10 and less than 105. For example, the value of $\alpha$ is 10,000, and the value of $\beta$ is 1. It should be understood by those skilled in the art that the values of $\alpha$ and $\beta$ may be set correspondingly according to a specific application scenario, and the embodiments of the present disclosure do not limit the values.

In some embodiments, the image style transform model includes a pixel-wise loss model and a perceptual loss model, where the pixel-wise loss model is a pixel-wise loss model obtained by taking minimization of the pixel-wise loss as a training target when being trained in the gradient domain, and the perceptual loss model is obtained by taking minimization of the perceptual loss as a training target when being trained in the gradient domain training.

The training process when the pixel-wise loss model is a pixel-wise loss model and the perceptual loss model is a perceptual loss model includes operations S11 to S14.

In operation S11, a gradient of a training sample is determined. Assuming that $I_i$ represents the i-th training sample, a gradient of the i-th training sample $I_i$ is determined as $\partial I_i$.

In operation S12, a gradient of the training sample is input to the pixel-wise loss model, and a sample output result of the training sample is obtained from the pixel-wise loss model, where the gradient $\partial I_i$ of the i-th training sample $I_i$ is input to the pixel-wise loss model $F_W$, and a sample output result $F_W(\partial I_i)$ of the training sample is obtained from the pixel-wise loss model.

In operation S13, a gradient of a stylized reference image corresponding to the training sample is determined, where the stylized reference image may be an unsatisfactory stylized reference picture obtained by the existing stylization algorithm. Assuming that a stylized reference image corresponding to the training sample $I_i$ is $\mathcal{L}(I_i)$, then the gradient of the reference image is $\partial \mathcal{L}(I_i)$.

In operation S14, the perceptual loss model is trained according to a first output feature map of the gradient of the reference image in a j-th convolutional layer of the perceptual loss model and a second output feature map of the sample output result in the j-th convolutional layer of the perceptual loss model. The j-th convolutional layer is any layer in the CNN model. When the CNN is VGG16, the j-th convolutional layer is a conv3-3 layer in the VGG16.

In some embodiments, the pixel-wise loss model includes a first convolutional layer set, an up-sampling layer, and a second convolutional layer set. The training the pixel-wise loss model according to the gradient of the reference image and the sample output result includes: inputting the gradient of the training sample to the first convolutional layer set to obtain a sample feature map; inputting the sample feature map to the up-sampling layer, and up-sampling the sample feature map to the pixel size of the initial image; and inputting the up-sampled sample feature map to the second convolutional layer set to obtain a sample output result.

In some embodiments, the training the perceptual loss model according to a first output feature map of the gradient of the reference image in a j-th convolutional layer of the perceptual loss model and a second output feature map of the sample output result in the j-th convolutional layer of the perceptual loss model includes:

the perceptual loss model is trained using the following equation:

$$L_{feat} = \frac{1}{C_j H_j W_j} \|\psi_j(\partial \mathcal{L}(I_i)) - \psi_j(F_W(\partial I_i))\|,$$

where $\partial I_i$ represents a gradient of an i-th training sample, $F_W$ represents the pixel-wise loss model, $F_W(\partial I_i)$ represents an output result of the gradient of the i-th training sample through the pixel-wise loss model, $\partial \mathcal{L}(I_i)$ represents a gradient of a stylized reference image of the i-th training sample; $\psi_j(\ )$ represents an output feature map of the j-th convolutional layer when the perceptual loss model adopts a convolutional neural network model, and $C_j H_j W_j$ respectively represent the number of channels, the height, and the width of the feature map corresponding to the j-th convolutional layer.

In some embodiments, when the CNN model is VGG16, the j-th convolutional layer is conv3-3.

In some embodiments, the training process when the pixel-wise loss model is a pixel-wise loss model includes operations S21 to S24.

In operation S21, a gradient of a training sample is determined; in operation S22, the gradient of the training sample is used as an input of the pixel-wise loss model, and a sample output result is obtained from the pixel-wise loss model; in operation S23, a gradient of a stylized reference image corresponding to the training sample is determined; and in operation S24, the pixel-wise loss model is trained according to the gradient of the reference image and the sample output result. The training the pixel-wise loss model according to the gradient of the reference image and the sample output result includes: training the pixel-wise loss model according to an absolute value of a difference between $F_W(\partial I_i)$ and corresponding $\partial \mathcal{L}(I_i)$ of each training sample; where $\partial I_i$ represents the gradient of the i-th training sample, $F_W$ represents the pixel-wise loss model, $F_W(\partial I_i)$ represents an output result of the gradient of the i-th training sample through the pixel-wise loss model $F_W$, and $\partial \mathcal{L}(I_i)$ represents the gradient of the stylized reference image of the i-th training sample.

In some embodiments, the training the pixel-wise loss model according to an absolute value of a difference between $F_W(\partial I_i)$ and corresponding $\partial \mathcal{L}(I_i)$ of each training sample includes: training the pixel-wise loss model by using the following equation:

$$L_{pixel} = \frac{1}{D} \sum_{i=0}^{D-1} \left\{ \frac{1}{2} \|F_W(\partial I_i) - \partial \mathcal{L}(I_i)\|^2 \right\},$$

where $\partial I_i$ represents the gradient of the i-th training sample, $F_W$ represents the pixel-wise loss model, $F_W(\partial I_i)$ represents an output result of the gradient of the i-th training sample through the pixel-wise loss model, $\partial \mathcal{L}(I_i)$ represents the gradient of the stylized reference image of the i-th training sample, and D represents a number of samples in a training sample set.

In some embodiment, the performing image reconstruction according to the feature map of the initial image in the gradient domain to obtain a style image includes: using an image that satisfies a structural similarity condition to a feature map of the initial image in the gradient domain as the style image. Satisfying the structural similarity condition to the feature map of the initial image in the gradient domain satisfies includes: a degree of structural difference between the style image and the initial image is less than a similarity threshold, or the degree of structural difference between the style image and the initial image is the smallest, where the degree of structural difference is a variation trend of the style image in the gradient domain and the feature map of the initial image in the gradient domain in at least one reference direction.

The reference direction may take the x and y directions of the image in the plane reference coordinate system. Certainly, there are other more directions, or only one direction is used. The degree of difference may adopt the difference or the absolute value of the difference or various mathematical deformation operations based on the difference (for example, the quadratic sum of the absolute difference values in the x and y directions, i.e., $\|\partial_x S - F_W(\partial_x I)\|^2 + \|\partial_y S - F_W(\partial_y I)\|^2$, where I represents the initial image, S represents the style image, and $\|\ \|$ represents an absolute value sign).

In some embodiments, the performing image reconstruction according to the feature map of the initial image in the gradient domain to obtain a style image includes: performing image reconstruction according to $\|\partial_x S - F_W(\partial_x I)\|^2 + \|\partial_y S - F_W(\partial_y I)\|^2$ to obtain the style image, where $\partial_x I$ represents the gradient of the initial image in the x direction, $F_W(\partial_x I)$ represents a feature map of the gradient of the initial image in the x direction in the gradient domain through the image style transform model, $\partial_y I$ represents the gradient of the initial image in the y direction, $F_W(\partial_y I)$ represents a feature map of the gradient of the initial image in the y direction in the gradient domain through the image style transform model, $\partial_x S$ represents the gradient of the style image in the x direction, and $\partial_y S$ represents the gradient of the style image in the y direction.

In some embodiments, the performing image reconstruction according to the feature map of the initial image in the gradient domain to obtain a style image includes: performing image reconstruction according to color information of the initial image and the feature map of the initial image in the gradient domain to obtain the style image. The performing image reconstruction according to color information of the initial image and the feature map of the initial image in the gradient domain to obtain a style image includes: using an image that satisfies a structural similarity condition to a feature map of the initial image in the gradient domain and an image that satisfies a color similarity condition to the initial image as the style image.

In some embodiments, the method further includes: performing feature extraction on the initial image to obtain a face region in the initial image. Correspondingly, the performing image reconstruction according to color information of the initial image and the feature map of the initial image in the gradient domain to obtain a style image includes: using an image that satisfies a structural similarity condition to a feature map of the initial image in the gradient domain, and an image that satisfies a color similarity condition to a face region in the initial image as the style image. The color similarity condition is a color similarity condition that the color information satisfies, that is, the degree of difference between the color of the style image and the initial image is less than a set value or the minimum, where the degree of difference of the color is represented by a difference between the colors of the sampling points of the image to be processed and the target image, i.e., is represented by $\|S-I\|$, where I represents the initial image, and S represents the style image).

In the embodiments of the present disclosure, in order not to change the color of the initial image or the skin color of the face, a color similarity condition is set, where the color similarity condition may be the color of the entire initial image, or may be the skin color of the face in the initial image. It should be noted that the above two conditions, i.e., the structural similarity condition and the color similarity condition can be used theoretically separately, that is, only one condition is used to calculate the style image; or the two conditions can be used simultaneously, and corresponding coefficients (weights) are assigned at the same time, for example, the value of $\lambda$ is a real number.

In some embodiments, the using an image that satisfies a structural similarity condition to a feature map of the initial image in the gradient domain and an image that satisfies a color similarity condition to the initial image as the style image includes: performing image reconstruction according to $\|S-I\|+\lambda\{\|\partial_x S - F_W(\partial_x I)\|^2 + \|\partial_y S - F_W(\partial_y I)\|^2\}$ to obtain the style image, where I represents the initial image, S represents the style image, $\partial_x I$ represents a gradient of the initial image in the x direction, $F_W(\partial_x I)$ represents a feature map of the gradient of the initial image in the x direction in the gradient domain through the image style transform model, $\partial_y I$ represents the gradient of the initial image in the y direction, $F_W(\partial_y I)$ represents a feature map of the gradient of the initial image in the y direction in the gradient domain through the image style transform model, $\partial_x S$ represents the gradient of the style image in the x direction, and $\partial_y S$ represents the gradient of the style image in the y direction.

In some embodiments, the inputting a gradient of the initial image to an image style transform model, and obtaining a feature map of the initial image in a gradient domain from the image style transform model includes: operation S31, a gradient of the initial image in at least one reference direction is determined; and operation S32, the gradient in the at least one reference direction is input to the image style transform model, and a feature map of the initial image in the at least one reference direction in the gradient domain is correspondingly obtained from the image style transform model, and correspondingly, image reconstruction is performed according to the feature map in the at least one reference direction in the gradient domain to obtain a style image.

In some embodiments, the at least one reference direction includes x and y directions in a plane reference coordinate system. Correspondingly, the determining the gradient of the initial image in at least one reference direction includes: determining the gradients of the initial image in the x and y directions, respectively. The inputting the gradient in at least one reference direction in the image style transform model, and correspondingly obtaining a feature map of the initial image in the at least one reference direction in the gradient domain from the image style transform model includes: respectively inputting the gradients in the x and y directions to the image style transform model, and correspondingly obtaining a feature map of the initial image in the x and y directions in the gradient domain from the image style transform model. Correspondingly, the performing image reconstruction according to the feature map in the at least one reference direction in the gradient domain to obtain a style image includes: performing image reconstruction according to the feature map in the x and y directions in the gradient domain to obtain the style image. The technical solution of the embodiments of the present disclosure is introduced in three phases. The structure of the CNN model provided by the embodiments of the present disclosure is introduced in the first phase, the training process of the provided CNN model is introduced in the second phase, and the process of image reconstruction using the trained CNN, i.e., a method for image style transform of an initial image is introduced in the third phase.

The First Phase: The Structure of the CNN Model

Figure 5A:
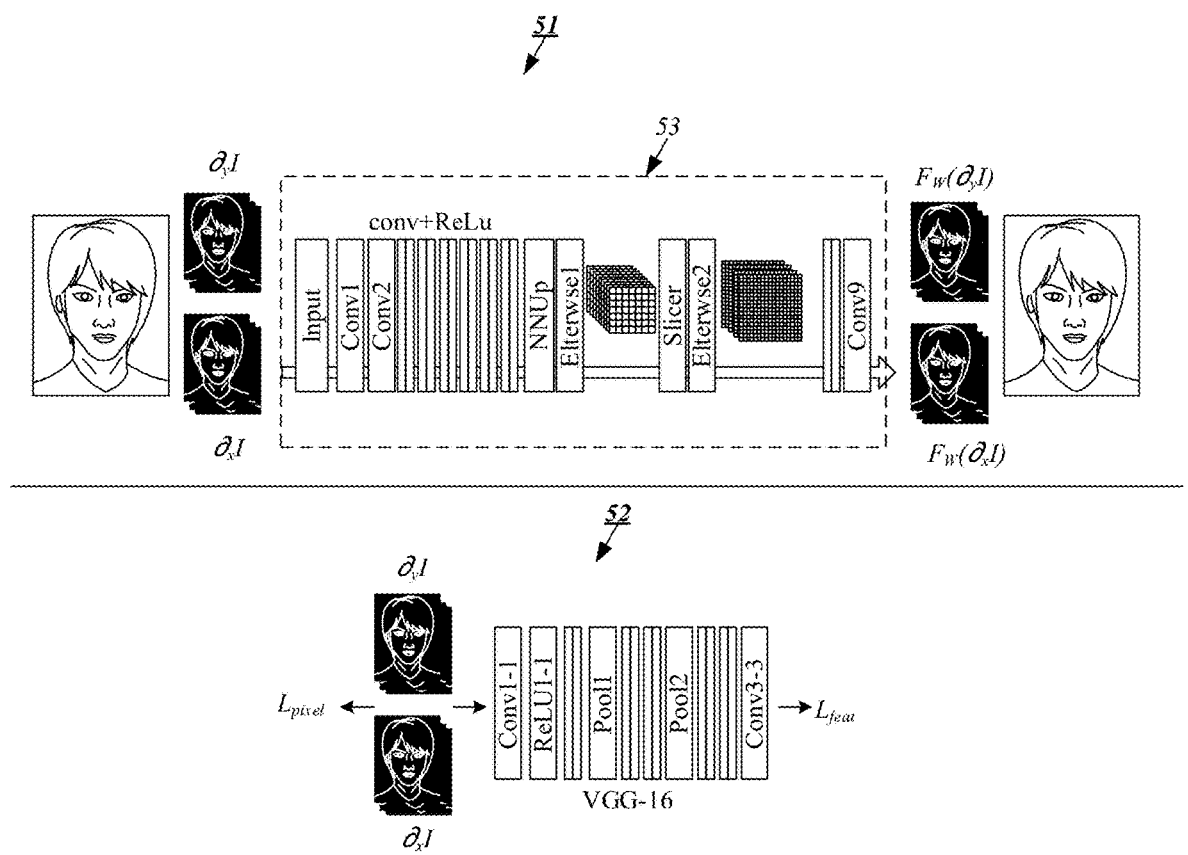
FIG. 5A is a schematic structural diagram of a convolutional neural network model according to embodiments of the present disclosure.

FIG. 5A is a schematic structural diagram of a CNN model according to embodiments of the present disclosure. As shown in FIG. 5A, the CNN model is composed of two parts:

The first part is a CNN 51 (a first CNN) to be trained, which takes the gradient of the self-portrait image as input, followed by a continuous convolutional layer and the ReLu layer, and then up-samples the feature map to the content image size by using the up-sampling operation, and finally calculates the pixel-wise Loss $L_{pixel}$ with the gradient of the artistic style reference image, where taking the gradient of the self-portrait image as input includes: respectively using the gradient $\partial_x I$ of the self-portrait image in the x direction and the gradient $\partial_y I$ of the self-portrait image in the y direction as the input of the CNN.

In the CNN, each convolution filter of the convolutional layer is repeatedly applied to the entire receptive field, the input self-portrait image is convoluted, and the result of convolution constitutes a feature map of the input self-portrait image, so that local features of the self-portrait image are extracted. One characteristic of CNN is: max-pooling sampling, which is a nonlinear down-sampling method. It can be seen from the mathematical formula of the max-pooling that the max-pooling is to take the maximum feature point in the neighborhood. After the image features are acquired by means of convolution, these features are used for classification. After the convolution feature map of the image is acquired, dimension reduction is performed on the convolution feature by means of a max-pooling sampling method. The convolution feature is divided into a number of disjoint regions, and the maximum (or average) features of these regions are used to represent the dimension-reduced convolution features. The function of the max-pooling sampling method is reflected in two aspects: (1) the max-pooling sampling method reduces the computational complexity from the upper hidden layer; and (2) these pooling units have translation invariance, even if the image has small displacement, the extracted features still remain unchanged. Due to the enhanced robustness to displacement, the max-pooling sampling method is an efficient sampling method for reducing the data dimension.

The second part is a VGG-16 network 52 (a second CNN) trained in ImageNet for calculating the perceptual loss $L_{feat}$.

The output of the conv3-3 layer of the VGG-16 is actually used to calculate the perceptual loss.

Finally, the sum of the $L_{pixel}$ of the first part and the $L_{feat}$ of the second part is the final total target function to be calculated (i.e., the total loss $L_{total}$).

In one embodiment, the total target function $L_{total}$ may be calculated using the following formula (3-1): $L_{total} = \alpha L_{feat} + \beta L_{pixel}$ (3-1), where the values of $\alpha$ and $\beta$ are real numbers. For example, $\alpha$ and $\beta$ are set to integers in training, respectively.

The image gradient is briefly introduced below. The image gradient is a method for describing the differences between image pixels and can be used as a feature of an image to representing the image. From the perspective of mathematics, the image gradient refers to a first-order derivative of the pixel. The following equations (3-2) and (3-3) may be used to represent the gradient $\partial_x I$ of the image in the x direction and the gradient $\partial_y I$ in the y direction, respectively:

$$\partial_x I = I(x, y) - I(x-1, y) \qquad (3-2).$$

$$\partial_y I = I(x, y) - I(x, y-1) \qquad (3-3).$$

It should be noted that there are many calculation methods for calculating the gradient of the image itself, as long as the difference between the pixels may be described. Those skilled in the art should understand that the gradient of the image is not necessarily calculated with the foregoing equations (3-2) and (3-3). In fact, other equations are generally used. For example, if the convolution operations are superimposed to calculate the image gradient, then a template used is generally called a gradient operator. Common gradient operators include a Sobel operator, a Robinson operator, a Laplace operator and so on.

The Second Stage: The Training Process of the First Part of the CNN

First, the training sample is determined. Assuming that D groups of training maps $(I_0, \mathcal{L}(I_0))$, $(I_1, \mathcal{L}(I_1))$, ..., $(I_{D-1}, \mathcal{L}(I_{D-1}))$ are collected, $I_i$ represents the i-th original image, and $\mathcal{L}(I_i)$ represents an unsatisfactory stylized reference image obtained from the i-th original image $I_i$ by using the existing stylization algorithm.

The definition of the pixel-wise loss $L_{pixel}$ calculated by the first part in FIG. 3 is as shown in equation (4-1):

$$L_{pixel} = \frac{1}{D}\sum_{i=0}^{D-1}\left\{\frac{1}{2}\|F_W(\partial I_i) - \partial\mathcal{L}(I_i)\|^2\right\} \qquad (4-1)$$

$$L_{pixel} = \frac{1}{D}\sum_{i=0}^{D-1}\left\{\frac{1}{2}\|F_W(\partial_x I_i) - \partial_x\mathcal{L}(I_i)\|^2 + \frac{1}{2}\|F_W(\partial_y I_i) - \partial_y\mathcal{L}(I_i)\|^2\right\}.$$

In equation (4-1), $\partial_x$ represents a gradient or gradient representation of the i-th original image $I_i$ in the x direction, and $\partial_y$ represents a gradient or gradient representation in the y direction. $\partial I_i$ represents the gradient of the original image, $\partial_x I_i$ represents the gradient of the original image $I_i$ in the x direction, and $\partial_y I_i$ represents the gradient of the original image $I_i$ in the y direction. $F_W$ represents the CNN model of the first part, and therefore, $F_W(\partial I_i)$ represents the result of the gradient of the i-th original image $I_i$ through the CNN model, $F_W(\partial_x I_i)$ represents the result of the gradient of the i-th original image $I_i$ in the x direction through the CNN model, and $F_W(\partial_y I_i)$ represents the result of the gradient of the i-th original image $I_i$ in the y direction through the CNN model. $\partial\mathcal{L}(I_i)$ represents the gradient of the stylized reference image of the i-th original image $I_i$, $\partial_x\mathcal{L}(I_i)$ represents the gradient of the stylized reference image of the i-th original image $I_i$ in the x direction, and $\partial_y\mathcal{L}(I_i)$ represents the gradient of the stylized reference image of the i-th original image $I_i$ in the y direction.

The definition of the perceptual loss $L_{feat}$ calculated by the second part in FIG. 3 is as shown in equation (4-2):

$$L_{feat} = \frac{1}{C_j H_j W_j}\|\psi_j(\partial\mathcal{L}(I_i)) - \psi_j(F_W(\partial I_i))\| \qquad (4-2)$$

$$L_{feat} = \frac{1}{C_j H_j W_j}\{\|\psi_j(\partial_x\mathcal{L}(I_i)) - \psi_j(F_W(\partial_x I_i))\| + \|\psi_j(\partial_y\mathcal{L}(I_i)) - \psi_j(F_W(\partial_y I_i))\|\}.$$

In equation (4-2), $\psi_j(\ )$ represents the output feature map of the j-th convolutional layer of the VGG-16 network, and $C_j$, $H_j$, and $W_j$ respectively represent the number of channels, the height and the width of the feature map corresponding to the j-th convolutional layer. In the process of implementation, the conv3-3 layer of the VGG-16 is used. The meanings of $F_W(\partial I_i)$ and $\partial\mathcal{L}(I_i)$ are the same as those in the first part. $F_W(\partial I_i)$ represents the result of the gradient of the original image through the network, and $\partial\mathcal{L}(I_i)$ represents the gradient of the stylized reference image of the original image.

The total target function is a sum of the perceptual loss $L_{feat}$ and the pixel-wise loss $L_{pixel}$.

$$L_{total} = \alpha L_{feat} + \beta L_{pixel} \qquad (4-3).$$

In equation (4-3), the values of $\alpha$ and $\beta$ are real numbers. For example, $\alpha$ and $\beta$ are respectively set to integers in training. In the training, $\alpha$ and $\beta$ are set to 10,000 and 1, respectively, and 100K iterations are performed with NVIDIA Titan X GPU. The adam optimization method is used to optimize the target function equation 3. The learning rate is $10^{-8}$ in the first 50K iterations. The the learning rate is set to $10^{-9}$ in the later 50K iterations. It should be noted that some modifications may be made to equations (4-1) and (4-2) by those skilled in the art during the implementation process. For equation (4-1), as long as these modifications can indicate pixel-wise loss, for example, ½ in equation (4-1) is modified to another value, such as ¼ or ⅓, etc., the square of the absolute value in equation (4-1) is modified to an absolute value, or the square of the absolute value in equation (4-1) is modified to the square root of the absolute value.

The Third Phase: The Image Reconstruction Process

When a new image is input, such as a new self-portrait image, the output stylized image is determined by using the following equation (5) to obtain a corresponding style image thereof.

$$\|S = I\| + \lambda\{\|\partial_x S - F_W(\partial_x I)\|^2 + \|\partial_y S - F_W(\partial_y I)\|^2\} \qquad (5).$$

In equation (5), I represents the new self-portrait image, i.e., the initial image, S represents the style image corresponding to the new self-portrait image, $\partial_x I$ represents the gradient of the self-portrait image in the x direction, $F_W(\partial_x I)$ represents the output of the gradient of the self-portrait image in the x direction through the trained model, and similarly, $\partial_y I$ represents the gradient of the self-portrait image in the y direction, $F_W(\partial_y I)$ represents the output of the gradient of the self-portrait image in the y direction through the trained model, $\partial_x S$ represents the gradient of the style image in the x direction, and $\partial_y S$ represents the gradient of the style image in the y direction. In the foregoing equation, ∥S−I∥ performs image reconstruction by using the color reconstruction by using color information of the content image. $\{\|\partial_x S-F_W(\partial_x I)\|^2+\|\partial_y S-F_W(\partial_y I)\|^2\}$ performs image reconstruction by using the structural information of the content image, and λ represents weight parameters of the two pieces of information. In the process of implementation, λ is 10. By optimizing the foregoing equation, S may be obtained, i.e., the style image of the new self-portrait image.

Figure 5B:
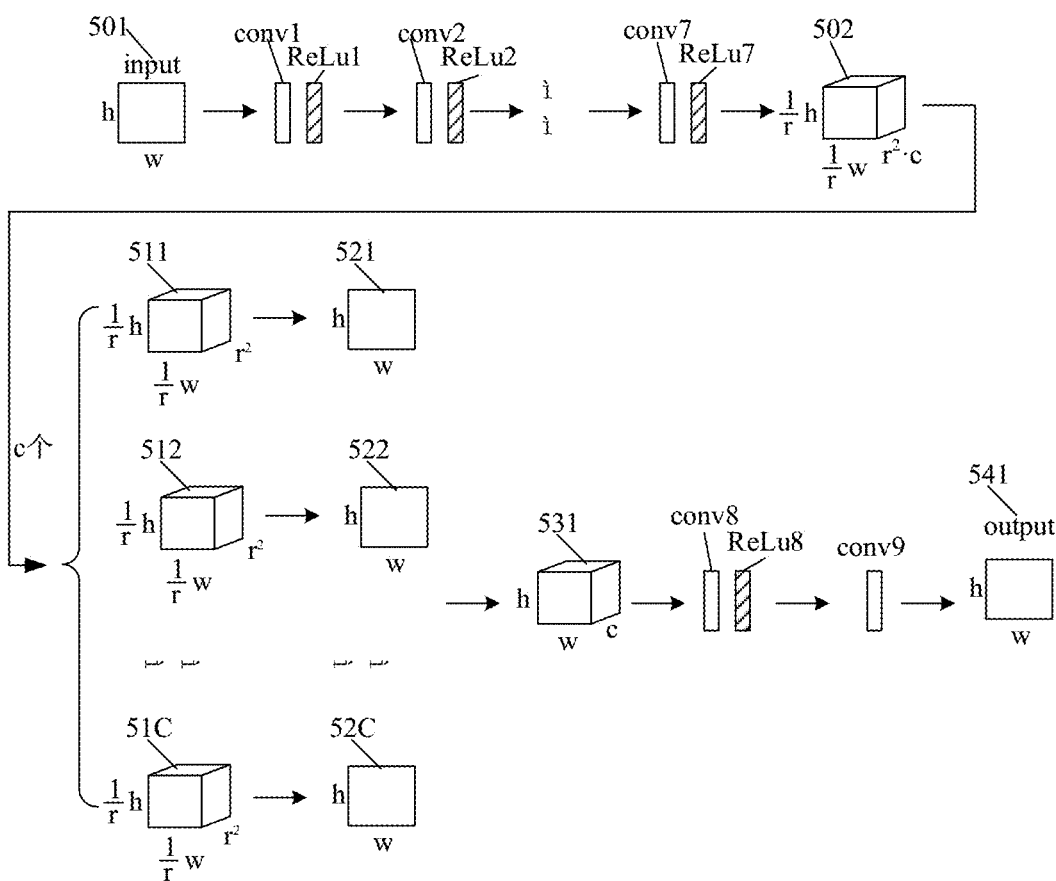
FIG. 5B is a schematic structural diagram of a pixel-wise loss model according to embodiments of the present disclosure.

In some embodiments, the first part is a CNN 51 to be trained (the first CNN), which may be the CNN as shown in FIG. 5B. FIG. 5B is a schematic structural diagram of a CNN model according to embodiments of the present disclosure. As shown in FIG. 5B, the model includes:

In an input layer 501, a gradient of the self-portrait image in the x or y direction is used as an input. It should be noted that h represents the high of the gradient of the self-portrait image in the x or y direction, and w represents the width of the gradient of the self-portrait image in x or y direction. For a self-portrait image I, the gradient of the self-portrait image I in the x direction is $\partial_x I$ and the gradient of the self-portrait image I in the y direction is $\partial_y I$ and then each color channel (or color component) of $\partial_x I$ and $\partial_y I$ is used as input. If a Red-Green-Blue (RGB) color model is used, there are three color channels. Correspondingly, for a self-portrait image, there are 6 inputs, namely, $\partial_x I$ in the R color channel, $\partial_x I$ in the G color channel and $\partial_x I$ in the B color channel, $\partial_y I$ in the R color channel, $\partial_y I$ in the G color channel, and $\partial_y I$ in the B color channel. Conv1+ReLu1 layer, conv2+ReLu2 layer, conv3+ReLu3 layer, conv4+ReLu4 layer, conv5+ReLu5 layer, conv6+ReLu6 layer, and conv7+ReLu7 layer.

After passing through the convolutional layer and the ReLu layer, the output result is a feature map 502 with the high of $$\frac{h}{r},$$

the width of $$\frac{w}{r},$$

and the number of channels of c, where r is a coefficient, and the values of r and c are related to model hyper-parameters of the convolutional neural network model in the embodiments of the present disclosure. In the embodiments of the present disclosure, the model hyper-parameter includes the size of a convolution kernel, the stride of the convolution kernel, and the padding of the input feature map. In general, the number of convolution kernels determines the number of channels c of the output feature map.

In the up-sampling layer, the inputs are 511 to 51C, and the outputs are 521 to 52C. The output feature map is disassembled according to the number of channels c, so that c feature maps 511 to 51C are obtained, and each of the feature maps 511 to 51C is up-sampled to the size of the initial image. The initial image mentioned in the input layer 501 is a self-portrait image, and the size of the self-portrait image is h*w, and thus, the sizes 521 to 52C of the up-sampled images output by the up-sampling layer are also h*w. In the up-sampling layer, the output corresponding to the input 511 is 521, the output corresponding to the input 512 is 522, and so on, and the output corresponding to the input 51C is 52C.

A synthesis layer 531 has inputs of 521 to 52C and an output of 531. The up-sampled images 521 to 52C are combined to obtain a feature map 531. An output layer has an input of 531 and an output of 541. The feature map 531 is convoluted and excited. That is, the feature map 531 is input to conv8, ReLu8, and conv9 to obtain an output 541, and the size of the output 541 is the size h*w of the original image.

It should be noted that the convolutional neural network model shown in FIG. 5B can be used to replace the network portion 53 in FIG. 5A. In the embodiments of the present disclosure, the convolution process before up-sampling has seven layers, respectively conv1 to conv7, and the excitation process before up-sampling also has seven layers, respectively ReLu1 to ReLu7. The seven convolutional layers (conv1 to conv7) may be regarded as a first convolutional layer set of the pixel-wise loss model. Certainly, the seven convolutional layers and the seven excitation layers (ReLu1 to ReLu7) may also be regarded as a first convolutional layer set of the pixel-wise loss model. After the up-sampling, there are also two convolutional layers, respectively conv8 and conv9. After the up-sampling, there is also another layer of excitation process, i.e., an excitation layer ReLu8. The two convolutional layers (conv8 and conv9) may be regarded as a second convolutional layer set of the pixel-wise loss model. Certainly, the two convolutional layers and the one excitation layer (ReLu8) may also be considered as a second convolutional layer set of the pixel-wise loss model.

Those skilled in the art should understand that the number of convolutional layers before the up-sampling (the number of convolutional layers in the first convolutional layer set) may vary, for example, five layers, nine layers, ten layers, or tens of layers. Correspondingly, the number of excitation layers before the up-sampling (the number of excitation layers in the first convolutional layer set) may also vary, for example, five layers, six layers, nine layers, 15 layers, etc. In the embodiments, before the up-sampling, the convolutional layer is followed by an excitation layer, that is, one convolutional layer and one excitation layer are alternated before the up-sampling. Those skilled in the art should understand that the number of alternating layers of the convolutional layers and the excitation layers may also vary, for example, two convolutional layers are followed by one excitation layer, and then one convolutional layer is followed by two excitation layers. In the embodiments of the present disclosure, the excitation function used by the excitation layer is ReLu. In some embodiments, the excitation layer may also adopt other excitation functions, such as a sigmoid function. The pooling layer is not shown in the embodiment of FIG. 5B. In some embodiments, a pooling layer may also be added. After the up-sampling, the number of convolutional layers (the number of convolutional layers in the second convolutional layer set), and the order of the convolutional layers and the excitation layers may vary.

Based on the foregoing embodiments, the embodiments of the present disclosure provide an image style transform apparatus, including various units, and various modules included in the units, which may be implemented by a processor in an electronic device, and certainly may be implemented by a specific logic circuit. In the process of implementation, the processor may be a Central Processing Unit (CPU), a Micro Processing Unit (MPU), a Digital Signal Processor (DSP), a Field Programmable Gate Array (FPGA), etc.

Figure 6:
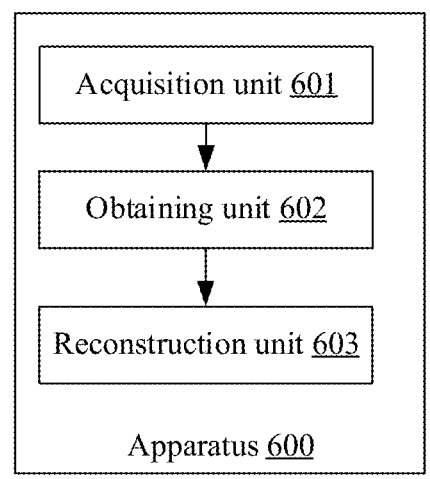
FIG. 6 is a schematic structural diagram of an image style transform apparatus according to embodiments of the present disclosure.

FIG. 6 is a schematic structural diagram of an image style transform apparatus according to embodiments of the present disclosure. As shown in FIG. 6, the apparatus 600 includes an acquisition unit 601, an obtaining unit 602, and a reconstruction unit 603.

The acquisition unit 601 is configured to acquire an initial image to be subjected to style transform. The obtaining unit 602 is configured to input a gradient of the initial image to an image style transform model, and obtain a feature map of the initial image in a gradient domain from the image style transform model, where the image style transform model is obtained by being trained in the gradient domain based on a pixel-wise loss and a perceptual loss. The reconstruction unit 603 is configured to perform image reconstruction according to the feature map of the initial image in the gradient domain to obtain a style image.

In some embodiments, the apparatus further includes: a training unit, configured to train the image style transform model, where a training target of the image style transform model is that a total loss $L_{total}$ is minimum, where $L_{total}$ is represented by the following equation:

$$L_{total} = \alpha L_{feat} + \beta L_{pixel},$$

wherein $L_{feat}$ represents the perceptual loss, $L_{pixel}$ represents the pixel-wise loss, and values of α and β are real numbers.

In some embodiments, the ratio of α to β is greater than 10 and less than 105.

In some embodiments, the image style transform model includes a pixel-wise loss model and a perceptual loss model, where the pixel-wise loss model is a pixel-wise loss model obtained by taking minimization of the pixel-wise loss as a training target when being trained in the gradient domain, and the perceptual loss model is obtained by taking minimization of the perceptual loss as a training target when being trained in the gradient domain training.

In some embodiments, the training unit includes: a first input module, configured to input a gradient of a training sample to the pixel-wise loss model, and obtain a sample output result of the training sample from the pixel-wise loss model; a first determining module, configured to determine a gradient of a stylized reference image corresponding to the training sample; and a first training module, configured to train the perceptual loss model according to a first output feature map of the gradient of the reference image in a j-th convolutional layer of the perceptual loss model and a second output feature map of the sample output result in the j-th convolutional layer of the perceptual loss model.

In some embodiments, the first training module trains the perceptual loss model by using the following equation:

$$L_{feat} = \frac{1}{C_j H_j W_j} \|\psi_j(\partial \mathcal{L}(I_i)) - \psi_j(F_W(\partial I_i))\|,$$

where $\partial I_i$ represents a gradient of an i-th training sample, $F_W$ represents the pixel-wise loss model, $F_W(\partial I_i)$ represents an output result of the gradient of the i-th training sample through the pixel-wise loss model, $\partial \mathcal{L}(I_i)$ represents a gradient of a stylized reference image of the i-th training sample; $\psi_j(\ )$ represents an output feature map of the j-th convolutional layer when the perceptual loss model adopts a convolutional neural network model, and $C_j H_j W_j$ respectively represent the number of channels, the height, and the width of the feature map corresponding to the j-th convolutional layer.

In some embodiments, when the convolutional neural network model is VGG16, the j-th convolutional layer is conv3-3.

In some embodiments, the training unit further includes: a second determining module, configured to determine a gradient of a training sample; a second input module, configured to use the gradient of the training sample as an input of the pixel-wise loss model, and obtain a sample output result from the pixel-wise loss model; a third determining module, configured to determine a gradient of a stylized reference image corresponding to the training sample; and a second training module, configured to train the pixel-wise loss model according to the gradient of the reference image and the sample output result.

In some embodiments, the pixel-wise loss model includes a first convolutional layer set, an up-sampling layer, and a second convolutional layer set. The training the pixel-wise loss model according to the gradient of the reference image and the sample output result includes: inputting the gradient of the training sample to the first convolutional layer set to obtain a sample feature map; inputting the sample feature map to the up-sampling layer, and up-sampling the sample feature map to the pixel size of the initial image; and inputting the up-sampled sample feature map to the second convolutional layer set to obtain a sample output result.

In some embodiments, the second training module is configured to train the pixel-wise loss model according to an absolute value of a difference between $F_W(\partial I_i)$ and corresponding $\partial \mathcal{L}(I_i)$ of each training sample, where $\partial I_i$ represents the gradient of the i-th training sample, $F_W$ represents the pixel-wise loss model, $F_W(\partial I_i)$ represents an output result of the gradient of the i-th training sample through the pixel-wise loss model $F_W$, and $\partial \mathcal{L}(I_i)$ represents the gradient of the stylized reference image of the i-th training sample.

In some embodiment, the second training module is configured to train the pixel-wise loss model by using the following equation:

$$L_{pixel} = \frac{1}{D}\sum_{i=0}^{D-1}\left\{\frac{1}{2}\|F_W(\partial I_i) - \partial \mathcal{L}(I_i)\|^2\right\},$$

where $\partial I_i$ represents the gradient of the i-th training sample, $F_W$ represents the pixel-wise loss model, $F_W(\partial I_i)$ represents an output result of the gradient of the i-th training sample through the pixel-wise loss model $F_W$, $\partial \mathcal{L}(I_i)$ represents the gradient of the stylized reference image of the i-th training sample, and D represents a number of samples in a training sample set.

In some embodiments, the reconstruction unit is configured to use an image that satisfies a structural similarity condition to a feature map of the initial image in the gradient domain as the style image.

In some embodiments, satisfying the structural similarity condition to the feature map of the initial image in the gradient domain satisfies includes: a degree of structural difference between the style image and the initial image is less than a similarity threshold, or the degree of structural difference between the style image and the initial image is the smallest, where the degree of structural difference is a variation trend of the style image in the gradient domain and the feature map of the initial image in the gradient domain in at least one reference direction.

In some embodiments, the reconstruction unit is configured to perform image reconstruction according to $\|\partial_x S - F_W(\partial_x I)\|^2 + \|\partial_y S - F_W(\partial_y I)\|^2$ to obtain the style image, where $\partial_x I$ represents the gradient of the initial image in the x direction, $F_W(\partial_x I)$ represents a feature map of the gradient of the initial image in the x direction in the gradient domain through the image style transform model, $\partial_y I$ represents the gradient of the initial image in the y direction, $F_W(\partial_y I)$ represents a feature map of the gradient of the initial image in the y direction in the gradient domain through the image style transform model, $\partial_x S$ represents the gradient of the style image in the x direction, and $\partial_y S$ represents the gradient of the style image in the y direction.

In some embodiments, the reconstruction unit is configured to perform image reconstruction according to color information of the initial image and the feature map of the initial image in the gradient domain to obtain a style image.

In some embodiments, the reconstruction unit is configured to use an image that satisfies a structural similarity condition to a feature map of the initial image in the gradient domain and an image that satisfies a color similarity condition to the initial image as the style image.

In some embodiments, the apparatus further includes: an extraction unit, configured to perform feature extraction on the initial image to obtain a face region in the initial image. Correspondingly, the reconstruction unit is configured to use an image that satisfies a structural similarity condition to a feature map of the initial image in the gradient domain, and an image that satisfies a color similarity condition to a face region in the initial image as the style image.

In some embodiments, the reconstruction unit is configured to perform image reconstruction according to $\|S-I\| + \lambda\{\|\partial_x S - F_W(\partial_x I)\|^2 + \|\partial_y S - F_W(\partial_y I)\|^2\}$ to obtain a style image, where I represents the initial image, S represents the style image, $\partial_x I$ represents a gradient of the initial image in the x direction, $F_W(\partial_x I)$ represents a feature map of the gradient of the initial image in the x direction in the gradient domain through the image style transform model, $\partial_y I$ represents the gradient of the initial image in the y direction, $F_W(\partial_y I)$ represents a feature map of the gradient of the initial image in the y direction in the gradient domain through the image style transform model, $\partial_x S$ represents the gradient of the style image in the x direction, and $\partial_y S$ represents the gradient of the style image in the y direction.

In some embodiments, the obtaining unit comprises: a fourth determining module, configured to determine a gradient of the initial image in at least one reference direction; and an obtaining module, configured to input the gradient in the at least one reference direction to the image style transform model, and correspondingly obtain a feature map of the initial image in the at least one reference direction in the gradient domain from the image style transform model. Correspondingly, the reconstruction unit is configured to perform image reconstruction according to the feature map in the at least one reference direction in the gradient domain to obtain a style image.

In some embodiments, the at least one reference direction includes x and y directions in a plane reference coordinate system. Correspondingly, the determining unit is configured to determine the gradients of the initial image in the x and y directions, respectively. The obtaining unit is configured to respectively input the gradients in the x and y directions to the image style transform model, and correspondingly obtain a feature map of the initial image in the x and y directions in the gradient domain from the image style transform model. Correspondingly, the reconstruction unit is configured to perform image reconstruction according to the feature map in the x and y directions in the gradient domain to obtain a style image.

The description of the foregoing apparatus embodiments is similar to the description of the foregoing method embodiments, and has similar advantages as the method embodiments. For the technical details that are not disclosed in the apparatus embodiments of the present disclosure, please refer to the description of the method embodiments of the present disclosure. It should be noted that in the embodiments of the present disclosure, when implemented in the form of a software functional module and sold or used as an independent product, the image style transform method may also be stored in a computer-readable storage medium. Based on such understanding, the technical solutions of the embodiments of the present disclosure essentially, or the part contributing to the prior art may be implemented in the form of a software product. The computer software product is stored in a storage medium, including several instructions for instructing a computer device (which may be a personal computer or a server, etc.) to perform all or some of the methods in the embodiments of the present disclosure. The foregoing storage medium includes any medium that can store program code, such as a USB flash drive, a removable hard disk, a Read-Only Memory (ROM), a Random-Access Memory (RAM), a magnetic disk, or an optical disk. In this case, the embodiments of the present disclosure are not limited to any particular combination of hardware and software. Correspondingly, the embodiments of the present disclosure provide a computer device, including a memory and a processor, where the memory stores a computer program that can be run in the processor, and the processor executes the program to realize operations of the image style transform method.

The embodiments of the present disclosure provide a computer-readable storage medium, having a computer program stored thereon, where when the computer program is executed by a processor, operations of the image style transform method are implemented. The embodiments of the present disclosure further provide a computer program product, including a computer executable instruction, where the computer executable instruction is executed to implement operations of the image style transform method. It should be noted here that the description of the foregoing storage medium and apparatus embodiments is similar to the description of the foregoing method embodiments, and has similar advantages as the method embodiments. For the technical details that are not disclosed in the storage medium and apparatus embodiments of the present disclosure, please refer to the description of the method embodiments of the present disclosure.

Figure 7:
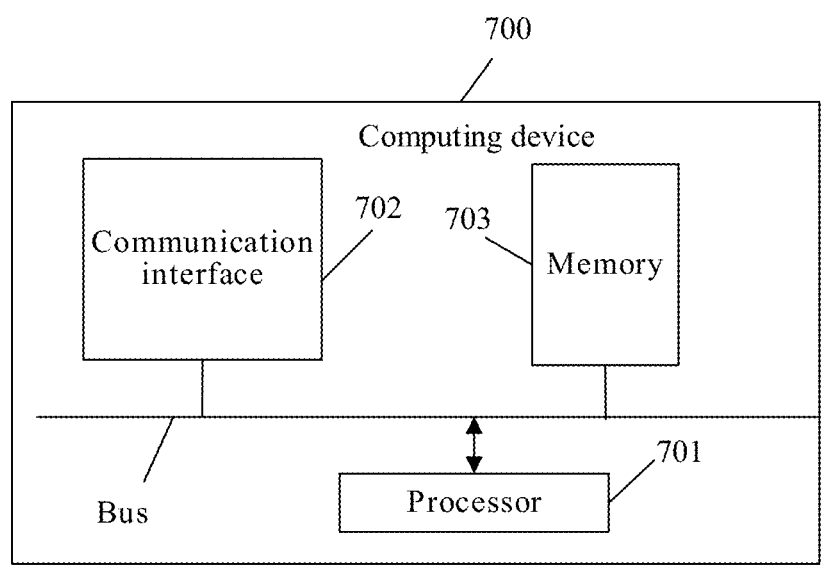
FIG. 7 is a schematic diagram of a hardware entity of a computer device according to embodiments of the present disclosure.

It should be noted that FIG. 7 is a schematic diagram of a hardware entity of a computer device according to the embodiments of the present disclosure. As shown in FIG. 7, the hardware entity of the computer device 700 includes: a processor 701, a communication interface 702, and a memory 703, where the processor 701 generally controls the overall operation of the computer device 700. The communication interface 702 may enable the computer device to communicate with other terminals or servers over a network. The memory 703 is configured to store instructions and applications executable by the processor 701, and may also cache data to be processed or processed by the processor 701 and each module of the computer device 700 (e.g., image data, audio data, voice communication data, and video communication data), which may be realized by a flash memory (FLASH) or RAM.

It should be understood that the phrase "one embodiment" or "an embodiment" mentioned in the description means that the particular features, structures, or characteristics relating to the embodiments are included in at least one embodiment of the present disclosure. Therefore, the phrase "in one embodiment" or "in an embodiment" appeared in the entire description does not necessarily refer to the same embodiment. In addition, these particular features, structures, or characteristics may be combined in one or more embodiments in any suitable manner. It should be understood that, in the various embodiments of the present disclosure, the size of the serial numbers in the foregoing processes does not mean the order of execution sequence. The execution sequence of each process should be determined by its function and internal logic, and is not intended to limit the implementation process of the embodiments of the present disclosure. The serial numbers of the embodiments of the present disclosure are merely for a descriptive purpose, and do not represent the advantages and disadvantages of the embodiments.

It should be noted that the term "comprising", "including" or any other variant thereof herein is intended to encompass a non-exclusive inclusion, such that a process, method, article, or apparatus that includes a series of elements includes those elements. Moreover, other elements not explicitly listed are also included, or elements that are inherent to the process, method, article, or device are also included. An element defined by the phrase "including one . . . " does not exclude the presence of additional same elements in the process, method, article, or apparatus that includes the element, without more limitations.

In some embodiments provided by the present disclosure, it should be understood that the disclosed device and method can be implemented in other manners. The device embodiments described above are merely illustrative. For example, the division of the unit is only a logical function division. In actual implementation, another division manner may be possible, for example, multiple units or components may be combined, or may be integrated into another system, or some features can be ignored or not executed. In addition, the coupling, or direct coupling, or communicational connection of the components shown or discussed may be indirect coupling or communicational connection by means of some interfaces, devices or units, and may be electrical, mechanical or other forms.

In addition, functional units in the embodiments of the present disclosure may be integrated into one processing unit, or may be separately used as one unit, or two or more units may be integrated into one unit. The integrated unit can be implemented in the form of hardware or in the form of hardware plus software functional units.

Alternatively, when implemented in the form of a software functional module and sold or used as an independent product, the integrated unit of the present disclosure may also be stored in a computer-readable storage medium. Based on such understanding, the technical solutions of the embodiments of the present disclosure essentially, or the part contributing to the prior art may be implemented in the form of a software product. The computer software product is stored in a storage medium and includes several instructions for instructing a computer device (which may be a personal computer or a server, etc.) to perform all or some of the methods in the embodiments of the present disclosure. Moreover, the foregoing storage media include various media capable of storing program codes such as a mobile storage device, an ROM, a magnetic disk, or an optical disk.

The above are only implementation modes of the present disclosure, but the scope of protection of the present disclosure is not limited thereto. Any person skilled in the art could easily conceive that changes or substitutions made within the technical scope disclosed in the present disclosure should be included in the scope of protection of the present disclosure. Therefore, the scope of protection of the present disclosure should be determined by the scope of protection of the appended claims.

The invention claimed is:

1. An image style transform method, comprising:
acquiring an initial image to be subjected to style transform;
inputting a gradient of the initial image to an image style transform model, and obtaining a feature map of the initial image in a gradient domain from the image style transform model, wherein the image style transform model is obtained by being trained in the gradient domain based on a pixel-wise loss and a perceptual loss; and
performing image reconstruction according to the feature map of the initial image in the gradient domain to obtain a style image.

2. The method according to claim 1, further comprising: training the image style transform model, wherein a training target of the image style transform model is that a total loss $L_{total}$ is minimum, wherein $L_{total}$ is represented by the following equation: $L_{total}=\alpha L_{feat}+\beta L_{pixel}$, where $L_{feat}$ represents the perceptual loss, $L_{pixel}$ represents the pixel-wise loss, and values of $\alpha$ and $\beta$ are real numbers.

3. The method according to claim 1, wherein the image style transform model comprises a pixel-wise loss model and a perceptual loss model, wherein the pixel-wise loss model is obtained by taking minimization of the pixel-wise loss as a training target when being trained in the gradient domain, and the perceptual loss model is obtained by taking minimization of the perceptual loss as a training target when being trained in the gradient domain training.

4. The method according to claim 3, wherein the training process of the pixel-wise loss model and the perceptual loss model comprises: inputting a gradient of a training sample to the pixel-wise loss model, and obtaining a sample output result of the training sample from the pixel-wise loss model;
determining a gradient of a stylized reference image corresponding to the training sample; and
training the perceptual loss model according to a first output feature map of the gradient of the reference image in a j-th convolutional layer of the perceptual loss model and a second output feature map of the sample output result in the j-th convolutional layer of the perceptual loss model.

5. The method according to claim 4, wherein the training the perceptual loss model according to a first output feature map of the gradient of the reference image in a j-th convolutional layer of the perceptual loss model and a second output feature map of the sample output result in the j-th convolutional layer of the perceptual loss model comprises: training the perceptual loss model by using the following equation:

$$L_{feat} = \frac{1}{C_j H_j W_j} \|\psi_j(\partial \mathcal{L}(I_i)) - \psi_j(F_W(\partial I_i))\|,$$

where $\partial I_i$ represents a gradient of an i-th training sample, $F_W$ represents the pixel-wise loss model, $F_W(\partial I_i)$ represents an output result of the gradient of the i-th training sample through the pixel-wise loss model, $\partial \mathcal{L}(I_i)$ represents a gradient of a stylized reference image of the i-th training sample; $\psi_j()$ represents the output feature map of the j-th convolutional layer when the perceptual loss model adopts a convolutional neural network model, and $C_j H_j W_j$ respectively represent the number of channels, the height, and the width of the feature map corresponding to the j-th convolutional layer.

6. The method according to claim 4, wherein the pixel-wise loss model comprises a first convolutional layer set, an up-sampling layer and a second convolutional layer set, and wherein the training the pixel-wise loss model according to the gradient of the reference image and the sample output result comprises:
inputting the gradient of the training sample to the first convolutional layer set to obtain the sample feature map;
inputting the sample feature map to the up-sampling layer, and up-sampling the sample feature map to a pixel size of the initial image; and
inputting the up-sampled sample feature map to the second convolutional layer set to obtain the sample output result.

7. The method according to claim 6, wherein the training the pixel-wise loss model according to the gradient of the reference image and the sample output result comprises: training the pixel-wise loss model according to an absolute value of a difference between $F_W(\partial I_i)$ and corresponding $\partial \mathcal{L}(I_i)$ of each training sample;
where $\partial I_i$ represents the gradient of the i-th training sample, $F_W$ represents the pixel-wise loss model, $F_W(\partial I_i)$ represents an output result of the gradient of the i-th training sample through the pixel-wise loss model $F_W$, and $\partial \mathcal{L}(I_i)$ represents the gradient of the stylized reference image of the i-th training sample.

8. The method according to claim 7, wherein the training the pixel-wise loss model according to an absolute value of a difference between $F_W(\partial I_i)$ and corresponding $\partial \mathcal{L}(I_i)$ of each training sample comprises: training the pixel-wise loss model by using the following equation $$L_{pixel} = \frac{1}{D}\sum_{i=0}^{D-1}\left\{\frac{1}{2}\|F_W(\partial I_i) - \partial \mathcal{L}(I_i)\|^2\right\},$$

where $\partial I_i$ represents the gradient of the i-th training sample, $F_W$ represents the pixel-wise loss model, $F_W(\partial I_i)$ represents an output result of the gradient of the i-th training sample through the pixel-wise loss model $F_W$, $\partial \mathcal{L}(I_i)$ represents the gradient of the stylized reference image of the i-th training sample, and D represents a number of samples in a training sample set.

9. The method according to claim 3, wherein the training process of the pixel-wise loss model comprises: using the gradient of the training sample as an input of the pixel-wise loss model, and obtaining a sample output result from the pixel-wise loss model;
determining the gradient of the stylized reference image corresponding to the training sample; and
training the pixel-wise loss model according to the gradient of the reference image and the sample output result.

10. The method according to claim 1, wherein the performing image reconstruction according to the feature map of the initial image in the gradient domain to obtain a style image comprises: using an image that satisfies a structural similarity condition to the feature map of the initial image in the gradient domain as the style image;
wherein satisfying the structural similarity condition to the feature map of the initial image in the gradient domain satisfies comprises:
a degree of structural difference between the style image and the initial image is less than a similarity threshold, or the degree of structural difference between the style image and the initial image is the smallest, wherein the degree of structural difference is a variation trend of the style image in the gradient domain and the feature map of the initial image in the gradient domain in at least one reference direction.

11. The method according to claim 10, wherein the performing image reconstruction according to the feature map of the initial image in the gradient domain to obtain a style image comprises: performing image reconstruction according to $\|\partial_x S - F_W(\partial_x I)\|^2 + \|\partial_y S - F_W(\partial_y I)\|^2$ to obtain the style image, where $\partial_x I$ represents the gradient of the initial image in an x direction, $F_W(\partial_x I)$ represents a feature map of the gradient of the initial image in the x direction in the gradient domain through the image style transform model, $\partial_y I$ represents the gradient of the initial image in a y direction, $F_W(\partial_y I)$ represents a feature map of the gradient of the initial image in the y direction in the gradient domain through the image style transform model, $\partial_x S$ represents the gradient of the style image in the x direction, and $\partial_y S$ represents the gradient of the style image in the y direction.

12. The method according to claim 1, wherein the performing image reconstruction according to the feature map of the initial image in the gradient domain to obtain a style image comprises: performing image reconstruction according to color information of the initial image and the feature map of the initial image in the gradient domain to obtain the style image.

13. The method according to claim 12, wherein the performing image reconstruction according to color information of the initial image and the feature map of the initial image in the gradient domain to obtain a style image comprises: using an image that satisfies a structural similarity condition to the feature map of the initial image in the gradient domain and an image that satisfies a color similarity condition to the initial image as the style image.

14. The method according to claim 13, wherein the using an image that satisfies a structural similarity condition to the feature map of the initial image in the gradient domain and an image that satisfies a color similarity condition to the initial image as the style image comprises: performing image reconstruction according to $\|S-I\|+\lambda\{\|\partial_x S - F_W(\partial_x I)\|^2 + \|\partial_y S - F_W(\partial_y I)\|^2\}$ to obtain the style image, where I represents the initial image, S represents the style image, $\partial_x I$ represents the gradient of the initial image in the x direction, $F_W(\partial_x I)$ represents a feature map of the gradient of the initial image in the x direction in the gradient domain through the image style transform model, $\partial_y I$ represents the gradient of the initial image in the y direction, $F_W(\partial_y I)$ represents a feature map of the gradient of the initial image in the y direction in the gradient domain through the image style transform model, $\partial_x S$ represents the gradient of the style image in the x direction, and $\partial_y S$ represents the gradient of the style image in the y direction.

15. The method according to claim 12, further comprising: performing feature extraction on the initial image to obtain a face region in the initial image; and correspondingly, the performing image reconstruction according to color information of the initial image and the feature map of the initial image in the gradient domain to obtain a style image comprises: using an image that satisfies a structural similarity condition to the feature map of the initial image in the gradient domain, and an image that satisfies a color similarity condition to a face region in the initial image as the style image.

16. The method according to claim 1, wherein the inputting a gradient of the initial image to an image style transform model, and obtaining a feature map of the initial image in a gradient domain from the image style transform model comprises: determining a gradient of the initial image in at least one reference direction;
   inputting the gradient in the at least one reference direction to the image style transform model, and correspondingly obtaining a feature map of the initial image in the at least one reference direction in the gradient domain from the image style transform model; and
   correspondingly performing image reconstruction according to the feature map in the at least one reference direction in the gradient domain to obtain the style image.

17. The method according to claim 16, wherein the at least one reference direction comprises x and y directions in a plane reference coordinate system, and correspondingly determining the gradients of the initial image in the x and y directions, respectively;
   respectively inputting the gradients in the x and y directions to the image style transform model, and correspondingly obtaining a feature map of the initial image in the x and y directions in the gradient domain from the image style transform model; and
   correspondingly performing image reconstruction according to the feature map in the x and y directions in the gradient domain to obtain the style image.

18. An image style transform apparatus, comprising:
a memory storing processor-executable instructions; and
a processor arranged to execute the stored processor-executable instructions to perform operations of:
   acquiring an initial image to be subjected to style transform;
   inputting a gradient of the initial image to an image style transform model, and obtaining a feature map of the initial image in a gradient domain from the image style transform model, wherein the image style transform model is obtained by being trained in the gradient domain based on a pixel-wise loss and a perceptual loss; and
   performing image reconstruction according to the feature map of the initial image in the gradient domain to obtain a style image.

19. The apparatus according to claim 18, wherein the processor is arranged to execute the stored processor-executable instructions to further perform an operation of:
   training the image style transform model, wherein a training target of the image style transform model is that a total loss $L_{total}$ is minimum, wherein $L_{total}$ is represented by the following equation: $L_{total} = \alpha L_{feat} + \beta L_{pixel}$, where $L_{feat}$ represents the perceptual loss, $L_{pixel}$ represents the pixel-wise loss, and values of $\alpha$ and $\beta$ are real numbers.

20. A non-transitory computer-readable storage medium having stored thereon computer executable instructions that, when executed by a processor, cause the processor to implement an image style transform method, the method comprising:
   acquiring an initial image to be subjected to style transform;
   inputting a gradient of the initial image to an image style transform model, and obtaining a feature map of the initial image in a gradient domain from the image style transform model, wherein the image style transform model is obtained by being trained in the gradient domain based on a pixel-wise loss and a perceptual loss; and
   performing image reconstruction according to the feature map of the initial image in the gradient domain to obtain a style image.

* * * * *